UNITED STATES PATENT OFFICE.

ERNST KAUDER, OF DARMSTADT, GERMANY.

PROCESS OF MAKING ALKYL-ETHERS OF MORPHIN.

SPECIFICATION forming part of Letters Patent No. 623,789, dated April 25, 1899.

Application filed January 23, 1899. Serial No. 703,161. (No specimens.)

*To all whom it may concern:*

Be it known that I, ERNST KAUDER, a subject of the Austrian Emperor, residing at Darmstadt, Grand Duchy of Hesse, Germany, have invented certain new and useful Improvements in Processes for Manufacturing Alkyl-Ethers of Morphin, of which the following is a full, clear, and exact description.

My invention relates to an improved process for preparing alkyl-ethers of morphin; and the object is to provide a more economical method of preparing the same.

Since the time when Grimaux introduced the method of preparing artificial codeia by treating morphin and alkali with methyliodid a great many preparations were tried to take the place of methyliodid in the same process. These investigations proved that different methyl compounds produce widely-differing effects. When methyliodid is used, the yield of codeia is insignificant to such extent that the process means a loss from a commercial point of view. The small yield is due to accompanying reactions and decompositions, which drawbacks should be avoided as completely as possible. Such requirements, however, are fully answered by using tri-alkyl-phosphates — for instance, trimethylphosphate—in producing codeia. The preferred method consists in adding to an alcoholic or other suitable solution of morphin the calculated molecular amount of alkali (being either alkali proper, such as soda, potassa, or otherwise an alkaline earth, such as lime, &c.) in the form of its hydrate or alcoholate, and then adding to the solution thus formed a neutral alkylphosphate in molecular quantities. The reaction commences by warming the mixture on a water-bath. The isolation of the codein or other alkyl-morphin formed, as well as of any small remnant of morphin, if such should have escaped the intended reaction, is brought about according to known methods.

An actual example of the manufacture is as follows: One hundred parts (by weight) of morphin, with seven hundred parts of methyl-, ethyl-, or other suitable alcohol, or with other suitable solvent, and 13.2 parts of sodium hydrate (or alcoholate) are made to enter into solution, to which is then added 46.2 parts of trimethyl phosphate. The mixture is then heated with a condensing-tube or for some hours under pressure at about 80° or 100° centigrade. The respective alkyl-morphin thus formed, as well as the non-alkylized morphin remaining over, is regained according to known methods.

What I claim is—

The process of preparing a alkyl-ethers of morphin by the action of a neutral alkyl-ester of phosphoric acid on a suitable solution of morphin whose replaceable hydroxyl-hydrogen has been replaced by a metal whose hydroxide possesses alkaline reaction.

Signed at Frankfort-on-Main, Empire of Germany, December 29, 1898.

ERNST KAUDER.

Witnesses:
DEAN B. MASON,
JEAN GRUND.